Jan. 4, 1938.  J. C. COX ET AL  2,104,608
CHANGE SPEED TRANSMISSION SYSTEM
Filed Jan. 21, 1935  3 Sheets-Sheet 2
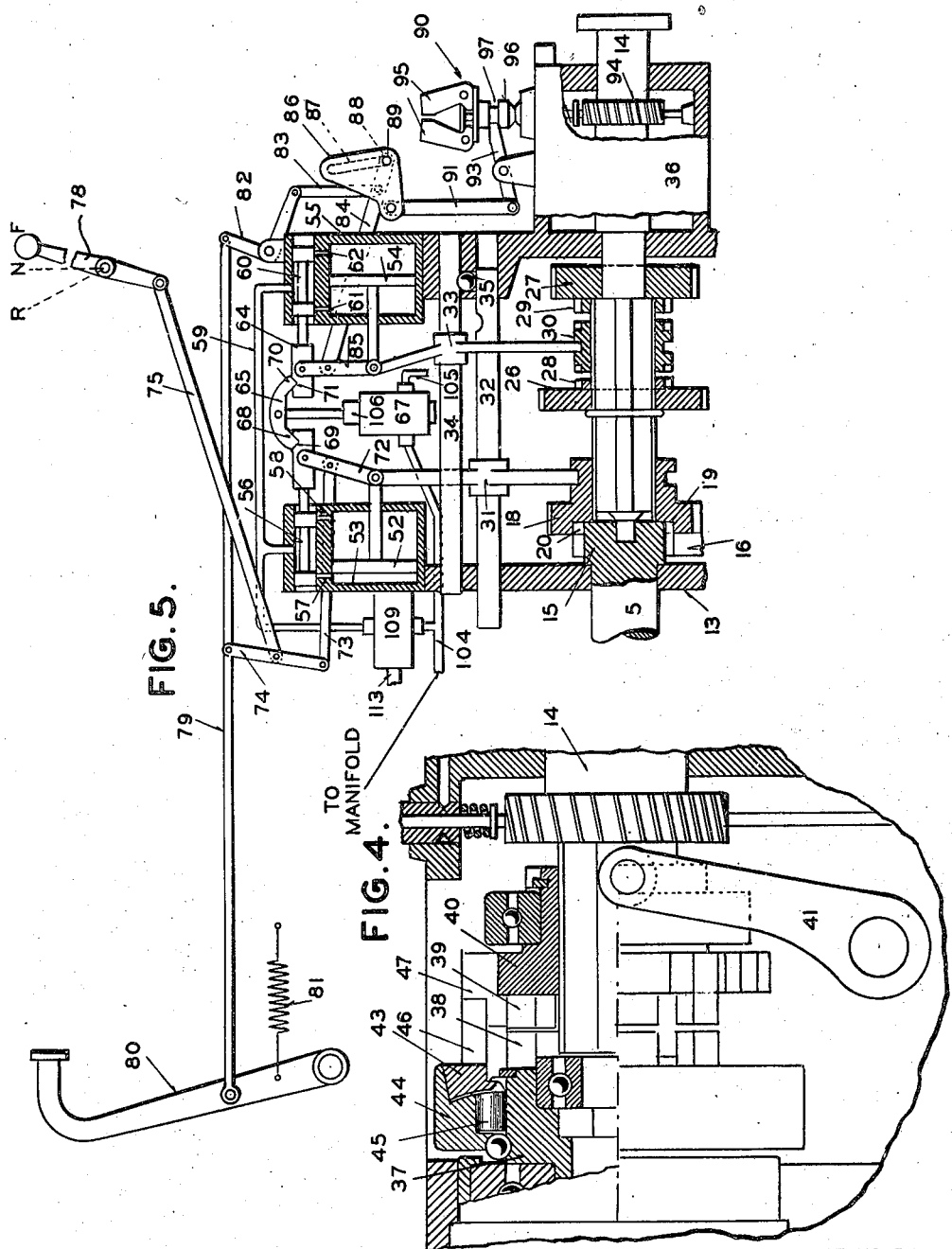
INVENTORS
J.C. COX
G.H. THOMAS
BY
ATTORNEY

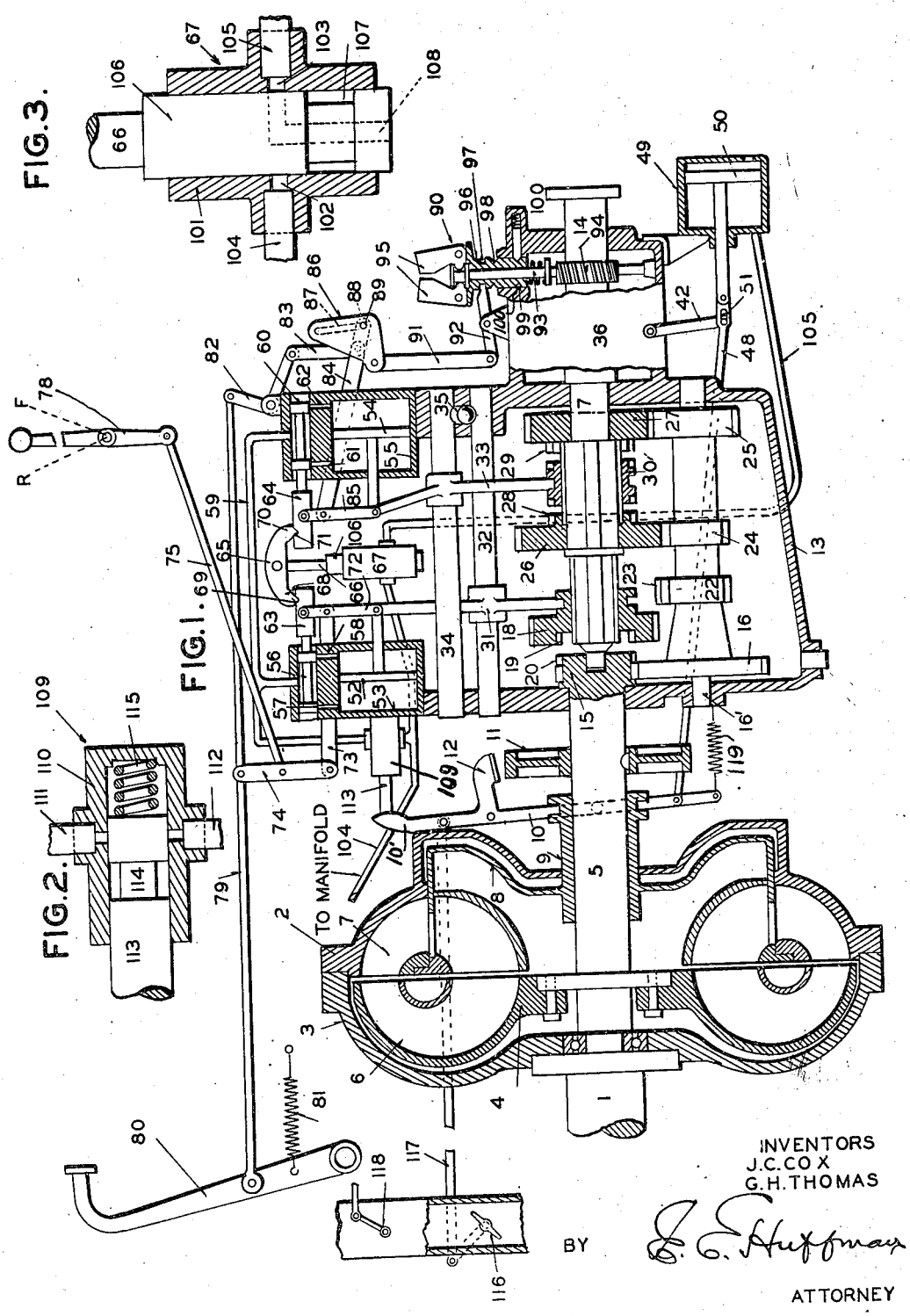

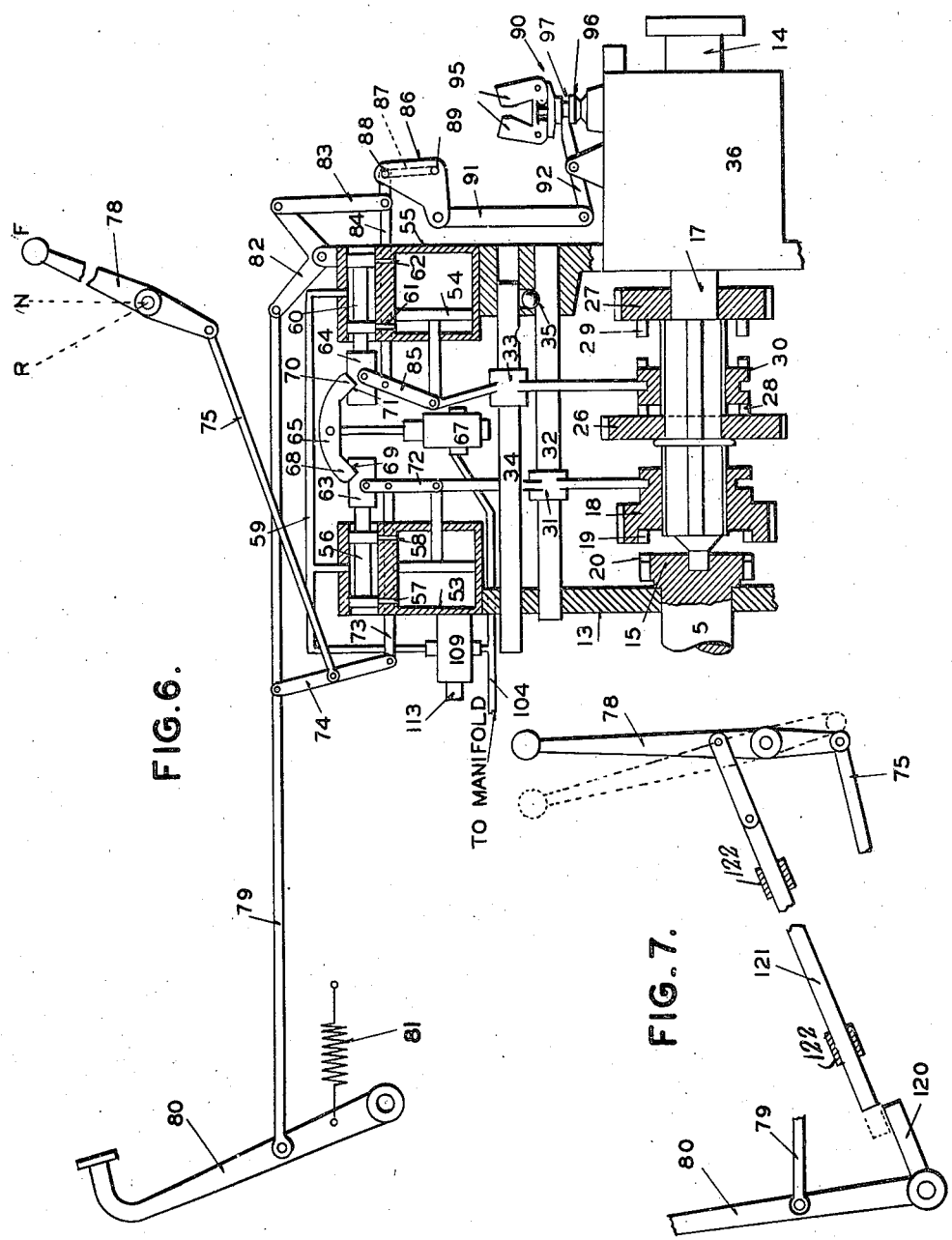

Patented Jan. 4, 1938

2,104,608

UNITED STATES PATENT OFFICE 2,104,608

CHANGE SPEED TRANSMISSION SYSTEM

John C. Cox and George Harry Thomas, St. Louis, Mo.; said Cox assignor to Wagner Electric Corporation, St. Louis, Mo., a corporation of Delaware, and said Thomas assignor to Piero Mariano Salerni, London, England Application January 21, 1935, Serial No. 2,616

16 Claims. (Cl. 192—.01)

Our invention relates to change speed transmissions for use on motor vehicles and other power driven mechanism wherein it is necessary to employ gearing for varying the speed between a driving shaft and a driven shaft, and more particularly to semi-automatic change speed transmissions wherein a certain group of speed ratios may be first manually selected and then the proper speed ratio of said group automatically connected in accordance with the speed of the driven or propeller shaft.

Our improved semi-automatic transmission is found to be very well adapted for use with a Fottinger type fluid coupling interposed between the engine and the change speed gearing, and also with a synchronized positive clutch interposed between the gearing and the propeller shaft of the vehicle, although it is to be understood that the transmission is not to be limited in its use.

One of the objects of our invention is to construct a change speed gearing which may be placed in high speed ratio by a manually settable means and automatically placed in a lower speed ratio by a second manual settable means and while the first named manually settable means remains in its set position.

Another object of our invention is to construct a power transmitting mechanism embodying a fluid coupling and a change speed gearing in which the change speed gearing is normally settable in high speed ratio by a manually-controlled means for starting and running the vehicle under normal load and in which the gearing may be changed to a lower speed ratio by a separate manually-controlled means whenever the load on the vehicle is too great for the high speed ratio.

Still another object of our invention is to provide an engine driven vehicle with a semi-automatic change speed gearing for inter-position between a fluid coupling, provided with a valve and brake, and a synchronized positive clutch in which the control mechanism for the gearing, the coupling valve and brake, and the positive clutch are all co-ordinated and operated by the engine suction and the transmission is normally manually settable in high speed ratio, but may be automatically shifted to a lower speed ratio by means of a separate manual control.

Other objects of our invention will become apparent from the following description taken in connection with the accompanying drawings showing one embodiment thereof in which Figure 1 is a diagrammatic view of a transmission mechanism embodying out invention and showing the position of the parts thereof when the change speed gearing is in neutral position; Figures 2 and 3 are enlarged cross-sectional views of the valves employed in controlling the transmission system; Figure 4 is a cross-sectional view of the synchronized positive clutch which is interposed between the change speed gearing and the propeller shaft of the vehicle; Figures 5 and 6 are partial views of the structure shown in Figure 1 but showing the position of the parts when the change speed gearing is in high speed and low speed positions respectively; and Figure 7 is a view showing an interlocking mechanism that may be employed to prevent the pedal from being actuated when the hand control lever is in reverse position.

Referring in detail to the drawings, the numeral 1 indicates the usual crank-shaft of an internal combustion engine or other suitable power plant which has connected thereto an hydraulic power transmitter 2. This hydraulic transmitter is of the Fottinger type and comprises an impeller 3 secured to the crankshaft 1 and a turbine element 4 secured to a shaft 5, which latter shaft is piloted in the crank-shaft 1. The impeller and the turbine element are provided with the usual cooperating vanes 6 and 7 which are disposed in the liquid circuit. The vanes on the impeller are formed in two parts in order to permit the use of a slidable valve 8 mounted upon the shaft 5 and capable of controlling the liquid circuit of the transmitter. The valve has a suitable sleeve 9 which extends to the exterior of the impeller for cooperation with a control lever 10. A brake drum 11 is secured to the interior portion of the shaft 5 and has cooperating therewith a friction element 12 which is also adapted to be controlled by the lever 10. When the valve 8 is in its normal position, that is, withdrawn from the liquid circuit, the braking element 12 is out of engagement with the brake drum 11 and the hydraulic transmitter is capable of transmitting power in the usual way from the engine shaft 1 to the shaft 5.

The shaft 5 extends into a casing 13 which houses the change speed gearing for varying the speed ratio between the shaft 5 and the propeller shaft 14 connected with the member to be driven, as for example, the road wheels of an automobile. The end of the shaft 5 carries a gear 15 constantly meshing with a gear 16 secured to a parallel counter-shaft 16'. The driven shaft 17 of the change speed gearing is in axial alignment with the shaft 5 and is piloted into the end thereof in the usual manner. The forward end of the shaft 17 has splined thereto a gear 18 provided with clutch teeth 19 for cooperation with clutch teeth 20 on gear 15 for directly connecting the shaft 5 and the shaft 17 so that they may rotate in a 1 to 1 ratio. Counter-shaft 16' also has secured thereto a gear 22 which is in constant mesh with an idling gear 23 for cooperation with gear 18 for producing reverse rotation of the propeller shaft. Also secured to the counter-shaft 16' are two gears 24 and 25 which mesh with gears 26 and 27 rotatively mounted on the driven shaft 17. The gears 26 and 27 are provided with clutch teeth 28 and 29, respectively, for cooperation with teeth on the end of the double clutch element 30 splined to the shaft 17 and capable of selectively connecting the gears 26 and 27 to the shaft 17.

The gear 18 is controlled by a shifting fork 31 secured to a longitudinally slidable rod 32 and the double clutch element 30 is controlled by a shifting fork 33 secured to a longitudinally slidable rod 34. The rods 32 and 34 are guided in the end of the transmission casing and have cooperating therewith the usual interlocking ball 35 for insuring that only one shifting fork will be moved at a time, thus preventing the simultaneous engagement of more than one gear.

The change speed gearing just described is very similar to the standard change speed gearing, differing in the arrangement of the gears however. The high speed ratio and the reverse ratio are controlled by the single shifting fork 31 and the low speed ratio and the second ratio are controlled by the other shifting fork 33.

The driven shaft 17 of the change speed gearing is connected to the propeller shaft 14 by means of a synchronized positive clutch 36, shown in Figure 4. This clutch is the same as that shown in the application of Piero Mariano Salerni for power transmission mechanism, filed August 1, 1932, Serial No. 27,196 and it will, therefore, be only briefly described.

The driven shaft 17 of the change speed gearing has secured thereto a member 37 carrying clutch teeth 38, which teeth are adapted to cooperate with clutch teeth 39 carried by the slidable member 40 splined to the propeller shaft 14. The slidable clutch element 40 is adapted to be actuated by means of a shifting fork 41 and an external control lever 42. The synchronizing means for preventing the teeth 38 and 39 of the clutch members from engaging until they have attained substantially synchronous speeds, comprises a synchronizer ring 43 carried within member 44 mounted upon the member 37 by means of one-way engaging rollers 45. The synchronizer ring 43 is provided with seatings 46 for cooperating with seatings 47 on the slidable member 40 for normally holding the member 40 from moving to such a position that the teeth 39 will engage the teeth 38. When the member 37 attains a speed slightly in excess of the speed of propeller shaft 14, the one-way engaging roller will pick up the member 44 and also the synchronizer ring 43 which has friction connection therewith and move the seatings 46 relative to the seatings 47, thus permitting the seatings 46 to pass into the gaps between the seatings 47, whereby the teeth 38 and 39 can become engaged.

The lever 42 for operating the synchronized clutch 36 is connected to the lever 10, which controls the valve 8 and the brake element 12, by means of rod 48 whereby the valve, the brake, and the synchronized clutch may be controlled by a single means, which single means in this instance is shown as a suction motor 49. The piston 50 of the suction motor is connected to the arm 42 by means of the lost motion device 51.

Suction motors provide means for shifting the gear 18 and the double clutch element 30. The shifting fork 31 has connected thereto the piston 52 of a suction motor 53, and the shifting fork 33 has connected thereto piston 54 of a suction motor 55. The suction motor 53 is controlled by a double piston valve 56 which, in its normal position, closes the ports 57 and 58 and cuts off communication between the suction motor and the suction conduit 59. The double piston valve 60 for controlling the suction motor 55, when in its normal position, closes the ports 61 and 62 and cuts off communication between the suction motor 55 and the suction conduit 59.

The valve 56 has an extension 63 and the valve 60 has an extension 64 for cooperation with lever 65 which is pivoted to the end of rod 66 controlling valve 67. Each end of the lever 65 has formed thereon a detent. The detent 68 is adapted to cooperate with a notch 69 in the extension 63 and detent 70 is adapted to cooperate with a notch 71 in the extension 64.

The extension 63 is connected to the piston rod of the piston 52 by means of a lever 72 and a rod 73 is connected at one of its ends to an intermediate part of the rod 72 and is connected at its other end to a floating lever 74. The intermediate portion of the lever 74 has pivoted thereto a rod 75 which is connected to the settable hand lever 78. The upper end of the floating lever 74 is pivoted to rod 79 which is controlled by a pedal 80 normally biased to its rearward position by spring 81, the other end of rod 79 being connected to a bell crank lever 82 pivoted on the rear of the transmission casing. This bell crank lever is in turn connected, by means of a rod 83, to a rod 84 which rod controls valve 60 by its connection with an intermediate portion of the lever 85 pivoted at one end to the extension 64 of the valve and at the other end to the piston rod of the piston 54 of the suction motor 55.

The rod 84 is also adapted to be controlled by a pivoted member 86 which is provided with a slot 87 into which extends a projection 88 on the end of rod 84. Member 86 is rotated on its pivot 89 by means of governor 90, which governor is connected to the member 86 by a rod 91 and a lever 92. The governor 90 is mounted on a shaft 93 driven by a gear 94 fixed to the propeller shaft and lying within the same casing which encloses the synchronized positive coupling 36. The governor weights 95 are pivoted to a sleeve 96, which sleeve receives the forked end of lever 92 in a suitable groove 97. The governor is adapted to move the sleeve 96 to two extreme positions, which positions are dependent upon the speed of the propeller shaft 14. The sleeve 96 has suitable notches 98 and 99 which cooperate with the detent 100 for holding the sleeve in the two extreme positions.

The valve 67 previously referred to and disclosed in detail in Figure 3, is for the purpose of controlling the suction motor 49 which operates the transmitter valve, the brake, and the synchronized coupling. The valve casing 101 is provided with a port 102 connected to the manifold of the engine by conduit 104 and a port 103 connected to the suction motor 49 by the conduit 105. The movable element of the valve comprises a piston 106 connected to the previously referred to lever 65 by means of rod 66. The piston 106 is provided with an annular groove 107 and a passage 108 whereby, when the piston is in the position shown in Figure 3, the suction motor 49 will be in communication with the atmosphere through the passage 108, and when the piston is in its other position the groove 107 connects the ports 102 and 103, thereby placing suction motor 49 in communication with the manifold.

The conduit 59 for placing suction motors 53 and 55 in communication with the manifold is provided with a control valve 109, as shown in detail in Figure 2. This control valve comprises a casing 110 having a port 111 in communication with the conduit 59 and a port 112 in communication with the manifold by means of a branch of conduit 104. The valve casing is provided with a piston member 113 having an annular groove 114, whereby the ports 111 and 112 may be placed in communication with each other when the groove is opposite the ports. When the piston is in any other position the ports 111 and 112 will be cut off by the piston member. A suitable spring 115 is adapted to bias the piston 113 to a position cutting off the ports 111 and 112. The valve 109 is controlled by lever 10 which, as previously stated, also controls the transmitter valve and the brake. To accomplish this control the lever 10 is shown as provided with an extension 10', against which abuts piston 113 of the valve.

In order to insure that the engine will be idling when a gear change is being made, the manifold of the engine is provided with an auxiliary valve 116 which is also controlled by lever 10 through connecting rod 117. The auxiliary valve is shown as being placed between the usual throttle valve 118 and the suction manifold. The throttle valve 118 is controlled by the usual pedal in the operator's compartment (not shown).

Referring now to the operation of our novel transmission system, the position assumed by the parts when the gearing is in neutral position is shown in Figure 1. The piston 106 of the valve 67 is in its lower-most position (Figure 3), thereby placing the suction motor 49 in communication with the atmosphere and by means of the mechanism connected to the piston 50 of the motor, the transmitter valve is maintained out of the liquid circuit, the brake disengaged, and the cynchronized positive clutch 36 engaged. The piston 113 of the valve 109 is in a position to cut off the conduit 59 from communicating with the manifold. The pistons 52 and 54 of the suction motors 53 and 55 for moving the gear shifting forks, are in their neutral positions, as shown. The hand control lever 78 is also in its neutral position and the pedal 80 is biased to its upper-most position. The hydraulic transmitter is capable of transmitting power from the shaft 1 to shaft 5, but since the gearing is in its neutral position no power can be transmitted to the propeller shaft 14.

Assuming that the vehicle is stopped on a level road and it is desired to start the vehicle, lever 78 is moved rearwardly to the position marked "F", which is the "forward" position. This movement of lever 78 causes the lever 74 to swing forwardly about its pivotal connection with the rod 79, resulting in the rod 73 moving valve 56 forwardly, thus placing the port 57 in communication with the conduit 59. The movement of valve 56 also results in the detent being moved out of the notch 69 in extension 63, thereby moving piston 106 of the valve 67 upwardly to a position where conduit 105 is placed in communication with conduit 104 by means of the annular groove 107. This places the suction motor 49 in communication with the manifold and, as a result of atmospheric pressure operating upon the piston 50, the transmitter valve 8 is moved into the liquid circuit, the teeth 38 and 39 of the positive clutch 36 disengaged, and the braking elements 11 and 12 engaged. Due to the lost motion connection 51 and the proper proportioning of the parts, the sequence of operation just named will result. Actuation of lever 10 also results in the valve 109 being opened to place conduit 59 in communication with the manifold by way of groove 114 in the piston 113. The auxiliary throttle control valve 116 is also moved to closed position when lever 10 is actuated, thereby insuring that the engine will be in idling condition during the gear changing operation. Insertion of valve 8 in the liquid circuit of the transmitter and the application of the brake causes shaft 5 to be stopped and, since the clutch 36 becomes disengaged prior to the application of the brake, the change speed gearing is isolated and power cannot be transmitted to the gearing from the engine or from the propeller shaft.

When conduit 59 is placed in communication with the manifold by means of valve 109, port 57 of the suction motor 53 would also be in communication with the manifold since, as previously described, the valve 56 has been moved to the left by movement of the lever 78. When valve 56 is in the position to uncover port 57, the port 58 is also uncovered and permits the right-hand side of the suction motor to be in communication with the atmosphere. As a result of these connections, the piston 52 of the suction motor will be moved to the left and since the shifting fork 31 is connected thereto, gear 18 will be moved to a position to engage the clutch teeth 19 and 20, thereby directly connecting the shaft 5 and shaft 17 of the gearing. The gearing is now in high speed ratio.

When piston 52 is moved to the left, lever 72 will be rotated about its pivotal connection with the rod 73, thereby moving valve 56 to the right and closing ports 57 and 58. When the valve 56 assumes its closed position, detent 68 of lever 65 will drop into notch 69, thus permitting the piston 106 of valve 67 to move downwardly, thereby cutting off communication of the suction motor 49 with the manifold and placing the motor in communication with the atmosphere. This causes piston 50 of the suction motor to be moved to the right to permit release of the brake and withdrawal of the transmitter valve 8 from the liquid circuit under the action of spring 119 connected to lever 10. The return of lever 10 to its normal position also closes valve 109 and opens the auxiliary throttle valve. The vehicle operator may now open the usual throttle valve 118, and as a result thereof the engine will be speeded up and power will be transmitted through the hydraulic transmitter and the clutch connection between shafts 5 and 17 to the member 37 of the clutch. Usually teeth 38 and 39 of the clutch 36 will be engaged as soon as the shifting fork 41 is released since, under the condition described (vehicle stopped), both sets of teeth are stationary. However, if this is prevented by the seatings on the synchronizer ring 43, slight rotation of member 37 and the member 43 will move the seatings sufficiently to permit teeth 38 and 39 of the clutch to engage. The position the parts will assume when the gearing is in high speed ratio is shown in Figure 5.

After clutch 36 has become engaged, speeding up of the engine will cause the vehicle to accelerate very smoothly due to slip of the hydraulic transmitter. It is here pointed out that by the use of the hydraulic transmitter, it is possible to start the vehicle in high speed gear ratio without any resulting frictional slip in any part of the transmitting system since power is always transmitted through the elements under sheer load. If a friction clutch were used in place of the hydraulic transmitter, it would be impractical to start the vehicle in high speed gear since the excessive slippage of the clutch would, in a short time, completely wear out the clutch.

When the change speed gearing is set in high speed ratio, the action of governor 90 which is driven from the propeller shaft will have no effect upon the control mechanism due to the fact that the axis of the projection on rod 84 which controls valve 60 with pivot 89 of the member 86 which is operated by the governor. The only effect the governor will have on the mechanism is to rotate the member 86 about the axis of its pivot.

When it is desired to have the change speed gearing placed in a lower speed ratio, as for example, in starting the vehicle rapidly, or when the vehicle encounters an incline, it is only necessary to move the pedal 80 into its forward position without changing the position of the hand lever 78. This will result in disengagement of the high speed clutch teeth 19 and 20 and the engagement of either the low speed gear or the intermediate gear, depending upon the speed of the propeller shaft or vehicle.

When pedal 80 is depressed and lever 78 is in its forward position, rod 84 is moved upwardly by means of rod 79, the bell-crank lever 82, and rod 83. If the vehicle is at rest or moving at a low rate of speed, say less than 15 miles per hour, the governor sleeve 96 will be biased by the governor spring to its uppermost position and held in such position by the detent 100. This position of the sleeve causes member 86 to be in the position shown in either Figure 1 or Figure 5.

The movement of rod 84 upwardly causes the projection 88 to be moved upwardly in slot 87 and, due to the angular position of the slot, rod 84 will be moved longitudinally, thereby causing valve 60 to be moved to the left. This movement of the valve will place the left-hand side of the suction motor 55 in communication with conduit 59 through port 61, and the right-hand side in communication with the atmosphere through port 62. The movement of valve 60 also results in the detent 70 on lever 65 being moved out of the notch 71, thereby causing valve 67 to connect the suction motor 49 with the manifold. When the suction motor 49 is operated, the transmitter valve 8 will be withdrawn, the synchronized positive clutch 36 will be disengaged, and the brake applied in a manner already described.

Simultaneously with the operation of valve 60, lever 74 will be rotated by the pedal 80 and rod 79 about its pivotal connection with rod 75, thereby causing valve 56 to be moved to the right. Movement of valve 56 causes the piston 106 to be moved upwardly by detent 68 being moved out of the notch 69, but this movement will not affect the communication between the conduits 104 and 105 since groove 107 in piston 106 is of sufficient width to maintain the connection regardless of whether both detents 68 and 70 are out of their notches or only one of the detents is out of its notch. When valve 56 is moved to the right, the right-hand side of suction motor 53 is placed in communication with the manifold and the left-hand side is placed in communication with the atmosphere, thus resulting in piston 52 being moved to the right from the position shown in Figure 5. The movement of piston 52 to the right will disengage clutch teeth 19 and 20 and simultaneously move valve 56 to the left to cut off communication between the manifold and the suction motor. When valve 56 assumes its neutral position detent 68 drops into notch 69 but valve 67 does not cut off communication between the manifold and the motor 49 due to the width of groove 107 in piston 106.

Although the suction motor 55 for actuating the shifting fork is subject to the suction of the manifold, at the time suction motor 53 is subject to the suction in the manifold, the piston 54 of suction motor 55 will not be operated, due to the fact that the interlocking ball 35 is maintained in the notch of rod 34 by the rod 32 as shown in Figure 5. As soon as rod 32 reaches its neutral position, piston 52 will cease to exert force thereon since the valve 56 has cut off the suction motor from the manifold. When rod 32 reaches this position, the interlocking ball is free to be shifted into the notch in rod 32 and thus permit suction motor 55 (which is already subject to the suction of the manifold) to move the double clutch element 30 and thereby connect the low gear to shaft 17. The connection of the low gear to shaft 17 permits power to be transmitted from shaft 5 through counter-shaft 16' to shaft 17 by way of the gears 24 and 26.

The movement of piston 54 to the left in the suction motor causes lever 85 to rotate about its pivotal connection with rod 84, thereby moving valve 60 to a position covering ports 61 and 62. When this position of the valve is reached the detent 70 will again engage notch 71 and permit piston 106 of valve 67 to assume a position where it places the suction motor 49 in communication with the atmosphere. Upon the suction motor 49 becoming inoperative, brake 12 will be released, the transmitter valve 8 withdrawn from the liquid circuit, and the coupling 36 allowed to engage after clutch teeth 38 and 39 thereof become substantially synchronized. Of course, if the vehicle is not moving when the low speed gear is engaged, clutch teeth 38 and 39 will become engaged immediately since neither are rotating. The position which the elements will assume when the gearing is in low speed ratio is shown in Figure 6.

If it be assumed that the vehicle is in low speed gear, the second speed gear may be automatically selected by the mere act of speeding up the engine. When the vehicle assumes a speed of approximately 15 M. P. H., the governor weights will be thrown outwardly and as a result, the governor sleeve 96 will be shifted downwardly so that detent 100 will engage the notch 98. This downward movement of the sleeve results in clock-wise rotation of the member 86 and since the projection 88 of rod 84 is in the upper end of slot 87, rod 84 will be moved longitudinally to the right, carrying with it the valve 60. Movement of valve 60 will result in positioning the valve 67 to operate the suction motor 49, whereby the transmitter valve, the clutch 36, and the brake will be operated in the manner already set forth.

The movement of valve 60 to the right uncovers ports 61 and 62 and as a result thereof the piston 54 of suction motor 55 will be moved to the extreme right, thereby moving the shifting fork 33 and the double clutch 30, disconnecting gear 26 from shaft 17 and connecting gear 27 to shaft 17. When piston 54 reaches its extreme right position the valve 60 will be moved to cut off ports 61 and 62, and piston 106 of valve 67 will be permitted to move to a position to vent the suction motor 49 as a result of detent 70 entering the notch 71.

When the gearing is in second speed ratio and it is desired to shift the gearing to a high speed ratio, it is only necessary to release the pedal 80, thereby causing valve 60 to be moved to the left by lowering rod 84. Movement of valve 60 results in the operation of the suction motor and the elements connected thereto and the subsequent disconnection of gear 27 from shaft 17. Release of the pedal also simultaneously causes operation of the valve 56 and, therefore, when the double clutch element 30 has been moved to its neutral position, suction motor 53 will be operated to engage clutch teeth 19 and 20 of the high speed ratio. When the high speed ratio has been engaged, detent 68 of lever 65 will drop into its notch 69, thereby permitting the valve 67 to vent suction motor 49. As a result of the suction motor being vented the brake will be disengaged, the transmitter valve 8 will be withdrawn, and the synchronized positive clutch 36 engaged after the engine has been speeded up sufficiently to rotate clutch teeth 38 at substantially the same speed as clutch teeth 39.

If the gearing is in low speed ratio and it is desired to go directly to the high speed ratio, it is only necessary to release pedal 80 and a cycle of events similar to that described with respect to the change speed ratio from second to high will take place. It is believed that a detailed description of this operation is unnecessary since such is apparently obvious from the operations already described.

From the foregoing description of the structure embodying our invention, it is readily seen that a transmission system has been produced which is quite simple in operation, the forward speeds being controlled by the operation of only two manually settable elements, each having two positions only. When the hand lever 78 is moved to forward position, high speed ratio is immediately engaged, and whenever it is desired to have a lower speed ratio, it is only necessary to depress pedal 80 and the lower speed ratio is immediately secured. The low speed ratio selected, however, will be dependent upon the speed of the vehicle. The transmission system permits the driver to have full control of the vehicle at all times.

The reverse gear of the change speed gearing is selected by moving the hand lever 78 forwardly to the position marked "R". This movement causes lever 74 to move rod 73 to the right and carry with it valve 56. Movement of valve 56 results in the operation of valve 67, the operation of suction motor 49 and the elements controlled thereby. Movement of valve 56 also connects suction motor 53 to the manifold and as a result thereof the shifter fork 71 is moved to the right, carrying with it the gear 18 and establishing a gear connection with the reverse idling gear 23. After gears 18 and 23 become engaged, valve 56 will be moved to neutral position to cut off the suction motor from the manifold, causing valve 67 to assume a position to vent suction motor 49 and establish reverse drive from shaft 1 to the propeller shaft.

In Figure 7 we have shown a suitable interlocking device for preventing lever 80 from being depressed when the hand lever 78 is in reverse position. The lever 80 is provided with an extension member 120 and the hand lever 78 has connected thereto a rod 121 guided in suitable bearings 122 and adapted to be moved into a position above the extension 120 when lever 58 is moved forwardly. It is thus seen that by this structure the pedal 80 is locked and cannot be depressed.

Having fully described our invention, what we claim as new and desire to secure by Leters Patent of the United States is:

1. In apparatus of the class described, a driving shaft, a driven shaft, change speed gearing interposed therebetween, power-operated means for changing the speed ratio of said gearing, manually settable means for causing said power-operated means to place the gearing in high speed ratio, and a combined manually settable means and speed controlled means for causing said power means to place the gearing in a lower speed ratio while said first named manual means remains in its set position.

2. In apparatus of the class described, a driving shaft, a driven shaft, change speed gearing interposed therebetween, fluid motors for changing the speed ratio of said gearing, valves for controlling said fluid motors, manually settable means for controlling one of the valves to thereby cause one of said fluid motors to place the gearing in high speed ratio, and a second manually settable means for controlling the other valve to thereby cause the other fluid motor to place the gearing in a lower speed ratio while said first named manual means remains in its set position.

3. In apparatus of the class described, a driving shaft, a driven shaft, change speed gearing interposed therebetween, fluid motors for changing the speed ratio of said gearing, valves for controlling said fluid motors, manually settable means for controlling one of the valves to thereby cause one of said fluid motors to place the gearing in high speed ratio, and a second manually settable means and speed controlled means for controlling the other valve to thereby cause the other fluid motor to place the gearing in a lower speed ratio while said first named manual means remains in its set position.

4. In apparatus of the class described, an engine, a fluid coupling connected thereto, a brake for the coupling, a propeller shaft, change speed gearing associated with the coupling and propeller shaft, a positive clutch for disconnecting the drive between the coupling and the propeller shaft to facilitate gear changing, means for actuating the brake and clutch, means for changing the speed ratio of said gearing, manual means for selecting a speed ratio of the gearing, separate manual means for selecting another speed ratio of said gearing while the first named manual means remains in its set position, and means for controlling the brake and clutch actuating means during speed ratio changing of the gearing.

5. In apparatus of the class described, an engine, a fluid coupling connected thereto and provided with a valve, a propeller shaft, change speed gearing associated with the coupling and propeller shaft, a positive clutch for disconnecting the drive between the coupling and the propeller shaft to facilitate gear changing, power-operated means for operating the valve of the coupling and the clutch, manually-controlled power-operated means for changing the speed ratio of the gearing, and means operable by the last-named means for governing the operation of the first named power-operated means during speed ratio changing of the gearing.

6. In apparatus of the class described, an engine, a fluid coupling connected thereto, a brake for the coupling, a propeller shaft, change speed gearing associated with the coupling and propeller shaft, a positive clutch for disconnecting the drive between the coupling and the propeller shaft to facilitate gear changing, power-operated means for operating the brake of the coupling and the clutch, manually-controlled power-operated means for changing the speed ratio of the gearing, and means operable by the last named means for governing the operation of the first named power-operated means during speed ratio changing of the gearing.

7. In apparatus of the class described, an engine, a fluid coupling connected thereto and provided with a valve, a propeller shaft, change speed gearing associated with the coupling and propeller shaft, a positive clutch for disconnecting the drive between the coupling and the propeller shaft to facilitate gear changing, power-operated means for operating the valve of the coupling and the clutch, combined manual and speed controlled power-operated means for changing the speed ratio of the gearing, and means operable by the last named means for governing the operation of the first named power-operated means during speed ratio changing of the gearing.

8. In apparatus of the class described, an engine, a fluid coupling connected thereto and provided with a valve, a propeller shaft, change speed gearing associated with the coupling and propeller shaft, a positive clutch for disconnecting the drive between the coupling and the propeller shaft to facilitate gear changing, power-operated means for operating the valve of the coupling and the clutch, manually-controlled power-operated means for changing the speed ratio of the gearing, means operable by the last named means for governing the operation of the first named power-operated means during speed ratio changing of the gearing, and means for throttling the engine during speed ratio changing.

9. In apparatus of the class described, an engine, a fluid coupling connected thereto and provided with a valve, a propeller shaft, change speed gearing associated with the coupling and propeller shaft, a positive clutch for disconnecting the drive between the coupling and the propeller shaft to facilitate gear changing, power-operated means for controlling the valve of the fluid coupling and the clutch, power operated means for changing the speed ratio of said gearing, manually settable means for causing the second named power-operated means to place the gearing in high speed position, a combined manually settable means and speed controlled means for causing said second named power-operated means to place the gearing in a lower speed ratio while said first named manual means remains in its set position, and means governed by the second named power-operated means for controlling the first named power-operated means during gear ratio changing.

10. In apparatus of the class described, a driving shaft, a driven shaft, change speed gearing interposed therebetween, power-operated means for changing the speed ratio of said gearing, manually settable means for causing said power-operated means to connect a speed ratio of said gearing, separate manually settable means for causing said power-operated means to disconnect said speed ratio and connect another speed ratio while the first named manually settable means remains in its set position, and means comprising a speed responsive device for predetermining said last named speed ratio.

11. In apparatus of the class described, a driving shaft, a driven shaft, change speed gearing interposed therebetween, a fluid motor and a valve for controlling one speed ratio of the gearing, a second fluid motor and a valve for controlling another speed ratio, manually settable means, lever and link mechanism connecting the said manually settable means and the first named valve, a second manually settable means, lever and link mechanism connecting said second manually settable means and the second named valve, and means for interconnecting the lever and link mechanisms whereby the second named manually settable means may control the first named valve without moving the first named manually settable means.

12. In apparatus of the class described, a driving shaft, a driven shaft, change speed gearing interposed therebetween, a fluid motor and a valve for controlling one speed ratio of the gearing, a second fluid motor and a valve for controlling another speed ratio, manually settable means, lever and link mechanism connecting the said manually settable means and the first named valve, a second manually settable means, lever and link mechanism connecting said second manually settable means and the second named valve, means for interconnecting the lever and link mechanisms whereby the second named manually settable means may control the first named valve without moving the first named manually settable means, and speed responsive means for controlling said second valve when the second manually settable means is actuated.

13. In apparatus of the class described, an engine, a fluid coupling connected thereto, a brake for the coupling, a propeller shaft, change speed gearing associated with the coupling and propeller shaft, a positive clutch for disconnecting the drive between the coupling and the propeller shaft to facilitate gear changing, power-operated means for operating the brake of the coupling and the clutch, manually-controlled power-operated means for changing the speed ratio of the gearing, a valve for controlling the last named power-operated means, means operable by the last named power-operated means for governing the operation of the first named power-operated means during speed ratio changing of the gearing, and means operable by the first named power-operated means for controlling said valve.

14. In apparatus of the class described, a driving shaft, a driven shaft, change speed gearing interposed therebetween and comprising means for directly connecting the driving and driven shafts, a counter shaft constantly geared to the driving shaft and connectable and disconnectable gearing between the counter shaft and driven shaft, power-operated means for changing the speed ratio of said gearing, means including a manual member movable to a predetermined position for causing said power means to connect gearing to establish a speed ratio, and additional means including a second manual member movable to a predetermined position to cause the power means to disconnect said gearing and connect other gearing to establish another speed ratio without movement of the first named manual member from its predetermined position.

15. In apparatus of the class described, a driving shaft, a driven shaft, change speed gearing interposed therebetween and comprising means for directly connecting the driving and driven shafts, a counter shaft constantly geared to the driving shaft and connectable and disconnectable gearing between the counter shaft and driven shaft, power-operated means for changing the speed ratio of said gearing, means including a manual member movable to a predetermined position for causing said power means to directly connect the driving and driven shafts of the gearing, and additional means including a second manual member movable to a predetermined position to cause said power means to disconnect the driving and driven shafts and connect the gearing between the counter shaft and driven shaft without movement of the first named manual member from its predetermined position.

16. In apparatus of the class described, a driving shaft, a driven shaft, change speed gearing interposed therebetween, fluid motors for changing the speed ratio of said gearing, valves for controlling said fluid motors, manually settable means for controlling one of the valves to thereby cause one of said fluid motors to establish a speed ratio of the gearing, and a second manual settable means for controlling both of said valves to thereby cause the first named fluid motor to disconnect said gearing and to cause the other fluid motor to establish a lower speed ratio of the gearing without moving the first named manual means from its set position for controlling the first named valve.

JOHN C. COX.
GEORGE HARRY THOMAS.